Jan. 7, 1958   H. R. VOIGT   2,818,839
ROTARY POWER MACHINE
Filed Oct. 25, 1954   3 Sheets-Sheet 1
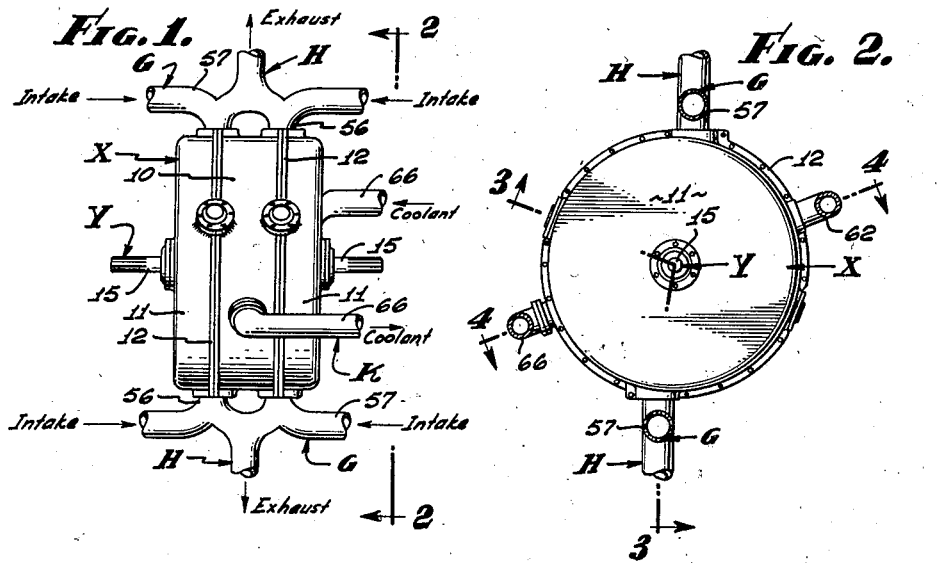
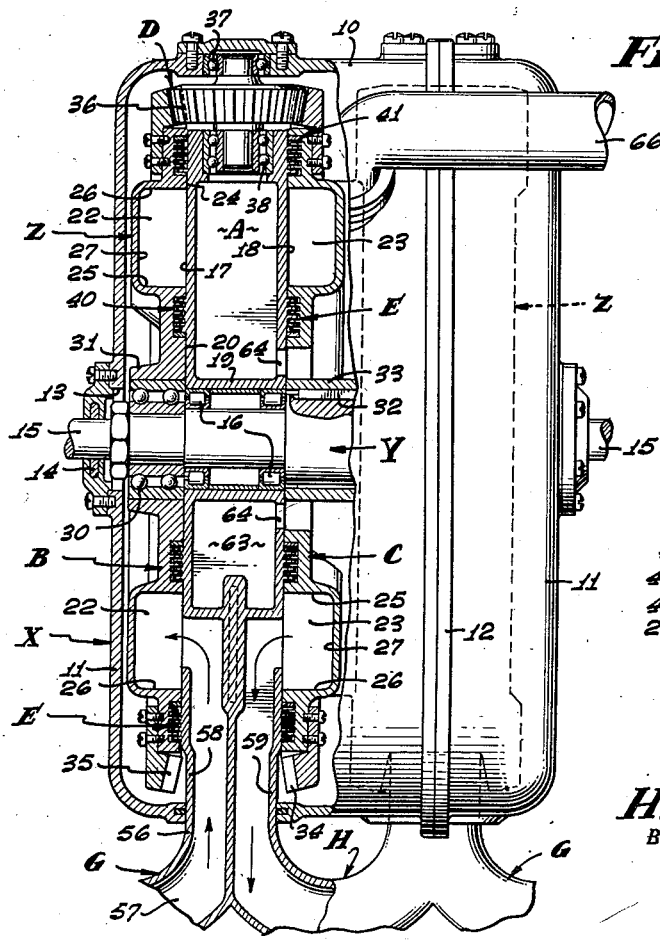
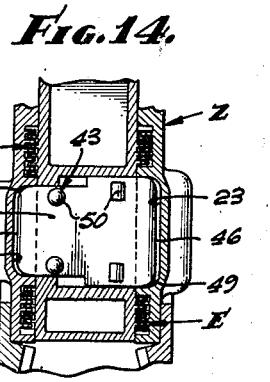
INVENTOR.
HELLMUT R. VOIGT
BY
AGENT.

Jan. 7, 1958 H. R. VOIGT 2,818,839
ROTARY POWER MACHINE
Filed Oct. 25, 1954 3 Sheets-Sheet 2
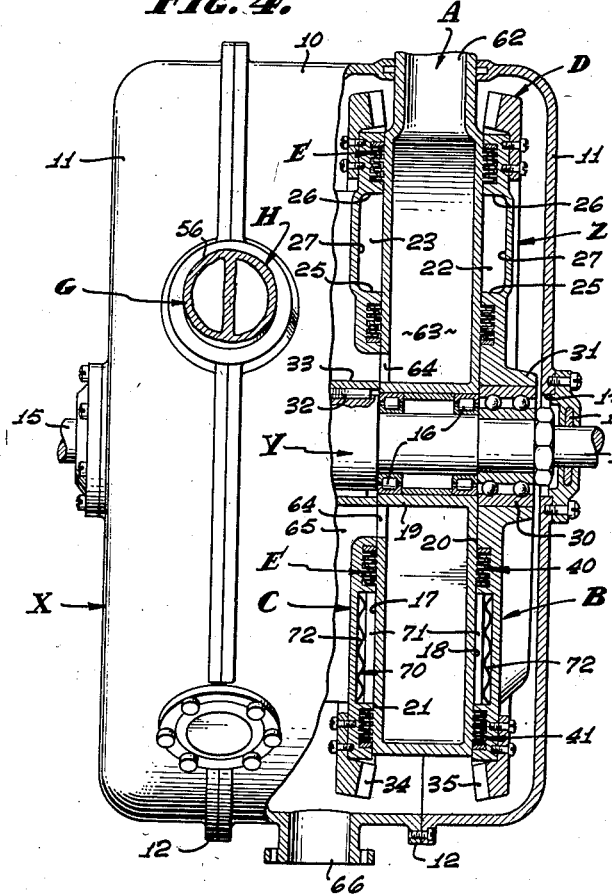
INVENTOR.
HELLMUT R. VOIGT
BY
AGENT.

Jan. 7, 1958      H. R. VOIGT      2,818,839
ROTARY POWER MACHINE
Filed Oct. 25, 1954      3 Sheets-Sheet 3
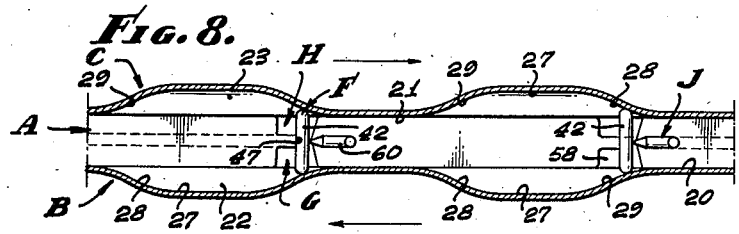
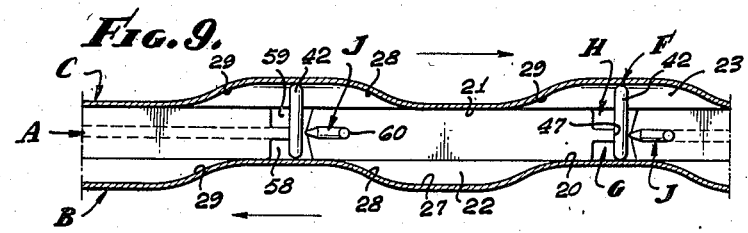
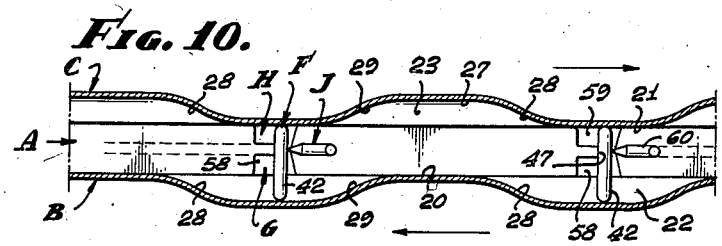
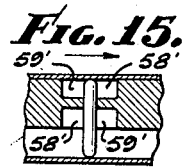
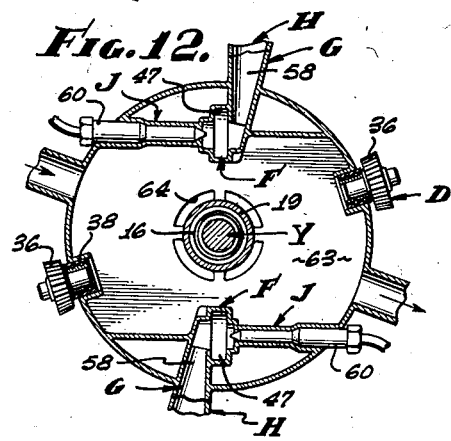
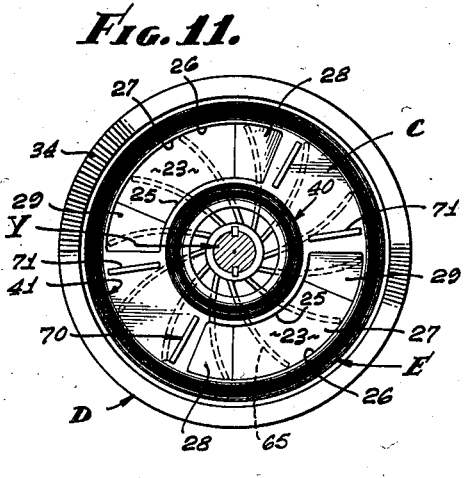
INVENTOR.
HELLMUT R. VOIGT
BY
AGENT.

United States Patent Office 2,818,839
Patented Jan. 7, 1958

2,818,839
ROTARY POWER MACHINE
Hellmut R. Voigt, Los Angeles, Calif.
Application October 25, 1954, Serial No. 464,339
13 Claims. (Cl. 123—14)

This invention relates to rotary power machines and is concerned with internal combustion engines and the like, and may also be adapted to use in connection with compressors or pumping machines for handling either gas or liquids. It is a general object of this invention to provide a rotary type machine of the character referred to adapted to either receive or deliver power, and since the machine of the present invention is particularly adapted to use as an internal combustion engine, I will describe it in that connection, it being understood that the machine is equally useful as a pumping machine such, for example, as a blower or compressor, or the like. The structure of the present invention is also useful as a motor, such as a fluid motor or steam engine, or the like.

The usual machines of the type under consideration are characterized by reciprocating parts, such, for example, as pistons and connecting rods, etc. A disadvantage of such machines is that each cycle of operation is accompanied by a reversal in motion of the working parts resulting in strain and vibration.

It is a general object of this invention to provide a simple, smoothly operating machine of high performance characteristics and which is reliable in operation.

An object of this invention is to provide a power machine which involves simple, easily formed stator and rotor elements, and to provide a machine which is of minimum diameter and which requires a minimum amount of space for installation.

It is still another object of this invention to provide a machine of the character referred to involving counter-rotating elements with simple, effective drive means therefor.

It is another object of the invention to provide rotors with fluid handling means adapted to receive fluids, such as gas, so that the fluids are compressed and so that when they are expanded the rotors are operated and so that the spent fluids are discharged or exhausted from the machine.

It is a further object of this invention to provide an effective sealing means between the rotating elements of the machine. In the structure that I have provided, there are counter-rotating rotors and a stator therebetween, and there are inner and outer sealing units that confine the fluid handled by the machine.

It is still another object of this invention to provide a simple and effective valve means for the rotary machine that I have provided, which means directs flow into the machine for the compression of fluids and which directs flow from the machine after the power stroke has been completed.

An object of this invention is to provide a combined coolant and lubricating fluid handling means that simultaneously cools and lubricates the entire structure.

The various objects and features of my invention will be fully understood from the following detailed description of typical preferred forms and applications of my invention, throughout which description reference is made to the accompanying drawings, in which:

Fig. 1 is a side view of a typical embodiment of the present invention. Fig. 2 is a view taken as indicated by line 2—2 on Fig. 1. Fig. 3 is an enlarged detailed view taken substantially as indicated by line 3—3 on Fig. 2 and showing parts of the structure in section. Fig. 4 is an enlarged detailed view taken substantially as indicated by line 4—4 on Fig. 2 and showing parts of the structure in section. Fig. 5 is an enlarged detailed view of the valve means that I have provided. Fig. 6 is a sectional view taken as indicated by line 6—6 on Fig. 5. Fig. 7 is a detailed sectional view taken as indicated by line 7—7 on Fig. 5. Figs. 8, 9 and 10 are diagrammatic views showing the cycles of operation of the machine of the present invention. Figs. 11 and 12 are transverse sectional views, Fig. 11 being taken through a rotor of the machine and Fig. 12 being taken through a stator of the machine. Fig. 13 is an enlarged detailed view of a portion of the structure shown in Figs. 5, 6 and 7. Fig. 14 is a view similar to Fig. 5 showing a modified form of my invention wherein the expansion chamber is of larger proportions than the compression chamber, and Fig. 15 is a diagrammatic view, similar to Figs. 8, 9 and 10, showing a modified portion of the machine.

The present invention has to do with a power machine and as illustrated throughout the drawings, is shown applied to an internal combustion engine and involves, generally, a case or frame X, a drive shaft Y and one or more power units Z. The case or frame X is preferably provided to house the units Z, and the drive shaft Y projects from the case at the ends thereof. The case or frame X is provided in the preferred form of the invention to enclose or house the elements of the machine and, as shown, may be sectional in construction in order to be assembled over the drive shaft Y and the power units Z. As shown in Fig. 1 of the drawings, the housing X is sectional, having a cylindrical center section 10 and bell-shaped end sections 11. The sections 10 and 11 are joined by suitable connections, such as flanged connections 12.

The drive shaft Y is a straight elongate shaft that extends through the case X centrally thereof and which projects from one or both ends thereof. As shown, the case X is provided with central end openings 13 receiving and passing the drive shaft Y so that reduced ends 15 of the shaft Y project beyond the ends 11 of the case. Suitable seals are provided at 14 to seal around the shaft ends 15.

In accordance with the present invention, there is provided one or more units Z that are carried by the shaft Y preferably within the housing X. The units Z are circular in form and are concentric with and supported by the shaft Y to have driving engagement therewith and are anchored to a support, such as the case X. The units Z are alike and each involves a stator A and rotors B and C carried by the drive shaft Y, means D driving the rotor B from the rotor C, sealing means E between the stator and the rotors, valve means F controlling flow of fluid to and from and between the rotors, fluid intake means G, fluid exhaust means H, fuel handling means J and coolant and lubricating means K.

The stator A is a flat, circular disc-shaped element through which the drive shaft Y passes and is engaged by suitable anti-friction bearings 16 carried in the stator A. The stator A is anchored to and also carried by the housing X by means of the means G and H, hereinafter described. The stator A is characterized by outer faces 17 and 18 that are in spaced parallel planes normal to the axis of the shaft Y and by a hub portion 19 adapted to be rotatably supported by the bearings 16.

The machine of the present invention is characterized by a charging rotor B and a drive rotor C, which are essentially alike and which, in practice, may be identical except for their connection with the drive shaft Y. The rotors B and C have flat inner faces 20 and 21, respectively, in planes normal to the drive shaft Y, which faces and the faces 17 and 18 of the stator A are juxtapositioned so that they closely approach each other leaving only a small space or gap therebetween.

In addition to the faces 20 and 21, the rotors B and C are provided with chambers 22 and 23, respectively, opening at the faces 20 and 21 and which are closed by the outer faces 17 and 18 of the stator A. The chambers 22 are charging chambers, while the chambers 23 are expansion or power chambers. There may be one chamber 22 or 23 in the face of each rotor, in which case the chamber is elongate and arcuate in form and extends circumferentially of the rotor through an arc of about 180°. Thus, about 180° of the faces 20 and 21 is left flat and uninterrupted. However, there may be a plurality of chambers 22 or 23 spaced from each other in a series circumferentially of the rotors and, as shown, there may be two chambers in each rotor.

When there are two chambers in the rotor B, there are two chambers 23 in the rotor C and, in accordance with the invention, the chambers 22 and 23 are alike in form and configuration. When there are two chambers in the rotors each chamber extends circumferentially of the rotors through an arc of about 90° leaving intermediate uninterrupted arcs in the faces 20 and 21 of about 90°. With two chambers in each rotor there will be two power cycles of the machine during each revolution of the machine, during which there is simultaneous expansion of gases in both chambers, as hereinafter described and, therefore, there is, in effect, four power cycles for every revolution of the machine.

The chambers 22 and 23 are formed in the rotors B and C, respectively, which rotors are counter-rotating relative to each other. The chambers are preferably identical to each other. Each chamber involves arcuate inner and outer walls 25 and 26 concentric with the axis of the shaft Y, a bottom wall 27 spaced outwardly from the face of the rotor and inclined end walls 28 and 29. The inner and outer walls 25 and 26 are joined to the bottom wall 27 and the inclined end walls 28 and 29 by filleted portions, and the bottom wall 27 is joined to the inclined walls by filleted portions so that the walls advantageously cooperate with the valve means F. In practice, the chambers 22 and 23 are of limited axial extent or depth and, therefore, the inclined walls 28 and 29 are pitched at a relatively shallow angle, all with the result that only a small amount of motion is imparted to the valve means F, hereinafter described. The end wall 28 may be termed the leading end wall, while the end wall 29 may be termed the trailing end wall, and since the rotors B and C are counter-rotating rotors it will be apparent that the end walls 28 and 29 of the two rotors B and C are oppositely related. That is, when the rotor B revolves counter-clockwise the end wall 28 of the rotor B is to the left, and the end wall 28 of the rotor C is to the right, as viewed in Figs. 8, 9 and 10 of the drawings.

The charging rotor B is rotatably supported by the drive shaft Y through suitable anti-friction bearings 30 and is, therefore, provided with a hub portion 31 adapted to receive the bearings and support the rotor B in a plane normal to the axis of the stator A, and so that the rotor B is freely rotatable relative thereto.

The power rotor C is fixedly supported by the drive shaft Y and is keyed thereto by keys 32 for driving engagement therewith and is, therefore, provided with a hub portion 33 adapted to receive the keys 32 and to support the rotor C in a plane normal to the axis of the stator A.

The means D driving the charging rotor B acts to counter-rotate the charging rotor from the drive rotor C so that the two rotors rotate in opposite directions and in timed relation, preferably as the same speed of rotation. The means D is shown as a simple gear drive involving, generally, a drive gear 34 carried by the drive rotor C, a driven gear 35 carried by the charging rotor B and an intermediate transfer gear 36 between the gears 34 and 35. The gears 34 and 35 are like ring gears carried by the rotors and each has a series of gear teeth at the periphery thereof, and the transfer gear 36 is a pinion gear operating between the gears 34 and 35. The transfer gear 36 is carried in a fixed position by anti-friction bearings 37 and 38 in the stator A and housing X, respectively. In practice, there may be one or more pinion gears 36 as circumstances require.

The sealing means E provided between the stator A and rotors B and C acts to retain fluid under pressure in the chambers 22 and 23. The sealing means E may be of the labyrinth-type and, as shown, involves inner and outer sealing units 40 and 41. The unit 40 is located adjacent the inner walls 25 of the chamber, while the unit 41 is located adjacent the outer walls 26 of the chambers and each involves circular axially disposed fin-like parts projecting alternately from the faces of the stator and rotors. It will be understood that the sealing means E may be varied as circumstances require.

The valve means F controls flow of fluid through the machine of the present invention so that fluid is drawn into the chamber 22 in the rotor B to be compressed therein, is transferred to the chamber 23 in the rotor C to be combusted therein, and is exhausted from the machine. The valve means F involves, generally, axially shiftable slides 42, bearing supports 43 for the slides, and sealing means 44. The slides 42 are carried by the stator A and when there are two chambers in each rotor B and C, there are two slides 42 carried at diametrically opposite portions of the stator.

Each slide 42 is a substantially rigid elongate member having ends 45 and 46 adapted to have sliding engagement with the faces 20 and 21 of the rotors and with the bottoms 27 and inclined walls 28 and 29 of the chambers in the rotors. Each slide 42 is slidably carried in an opening 47 extending through the stator A from the face 17 to the face 18 to be movable between the positions shown in Figs. 5, 6 and 7 of the drawings. Each slide 42 is flat with side faces 48 that have bearing engagement with the opening 47, and the ends 45 and 46 of the slide are rounded in order to insure smooth contact with the inclined faces of the chamber. The upper and lower edges of the slide 42 are straight and parallel and are adapted to have sliding engagement with the walls 25 and 26 of the chambers.

The rotors are so related that the leading end wall 28 of the chamber 23 is engaged with the slide 42 simultaneously with the trailing end 29 of the chamber 22, with the result that the slide 42 is shifted in one direction. It will be apparent that the slide 42 is shifted in the other direction when the trailing end 29 of the chamber 23 engages the slide 42 simultaneously with the leading end 28 of the chamber 22. The corners of the slide are rounded at 49 to fit the configuration of the chamber, as above described.

The bearing support 43 for the slide 42 is preferably an anti-friction means comprising rollers or ball bearings 50, which rollers and/or balls are carried by pockets formed in the walls of the opening 47. As shown, the opening 47 is enlarged at the forward side at 52 providing a continuous uninterrupted passage for flow of fluids from the chamber of one rotor to the chamber of the other rotor. The rear side of the opening 47 is provided with a spring biased sealing member 53 located centrally of the stator to prevent flow axially of the stator from one face to the other thereof.

The sealing means 44 is adapted to engage between the slide 42 and the walls of the chambers 22 and 23 and involves spring biased wipers 54 carried in slots 55 in the slide 42. The wipers 54 are U-shaped and conform in configuration to the configuration of the slide 42 and are shiftable in the slots 55 so that they remain in continuous contact with the bottoms and inclined walls of the chambers.

The fluid intake means G and fluid exhaust means H are simple fluid handling ducts or passages and, in practice, are formed integrally with the stator. As shown, the means G and H are combined in a laterally projecting member 56 that extends through the outer wall of the case where it is anchored and is adapted to receive and discharge fluids through suitable ducts 57. The fluid intake means G involves a tube 58 that extends into the stator and opens at the face 17 adjacent the slide 42. The fluid exhaust means H involves a tube 59 that extends into the stator and opens at the face 18 adjacent slide 42. The tubes 58 and 59 open adjacent the slide 42 at the rear side thereof, so that the fluid is delivered to the chamber 22 and is received from the chamber 23. The sealing member 53, above referred to, seals between the tubes 58 and 59 at the point where they open adjacent the slide 42.

As best illustrated in Figs. 4 and 11 of the drawings, I have provided pressure seals 70 carried by the rotors B and C and engageable with the faces 17 and 18 of the stator respectively. The seals may be used as required and as shown in the drawings, I have provided a seal 70 at each end of the chambers 22 and 23. Each seal 70 preferably involves a wiper 71 and a spring 72 that yieldingly urges the wiper into pressure engagement with the face of the rotor. The seals 70 are radially disposed in the faces of the rotors and extend between the seals 40 and 41 above described.

When the machine of the present invention is used as an internal combustion engine, a fuel handling means J may be provided of suitable form. For example, in a gas engine a carburetor may be employed and spark plugs provided for ignition, etc. However, as shown, the machine is adapted to diesel engine construction, in which case an injector nozzle 60 may be provided and carried by the stator to direct the fuel into the combustion chamber formed by the enlargement at 52 in the opening 47 and by the end portion of the chambers 22 and 23 in the drive rotor. It is to be understood that suitable pumping or distributing means may be employed and other necessary means provided to complete the fuel system. As shown in Fig. 7 of the drawings, there may be provided a hydraulic plunger unit 80 operated by cam faces on one of the rotors. In practice, the unit 80 can be operated by the inclined end walls 28 and 29 of the chambers. The distributing means is provided to inject fuel into the combustion chamber above referred to, at the proper moment during operation of the machine.

It is a feature of the present invention that I have provided a combined coolant handling and lubricating means. As shown, the case X encloses the power units Z and is adapted to act as a vessel. Coolant in the form of lubricating oil is supplied to the machine through ducts 62 that enter the case and connect to the units Z. The units are characterized by chambered interiors 63 that receive the coolant oil, which oil is discharged through ports 64 preferably near the center of the units. Suitable vanes 65 (see Fig. 11) act upon the coolant oil to centrifugally force the fluid outwardly to discharge from the case X through openings and ducts 66 in the outer wall thereof.

From the foregoing it will be apparent that I have provided an extremely practical power machine adapted for use as a compressor or pump, and, as illustrated, a machine adapted for use as an internal combustion engine, for example, a diesel engine. With the structure above described and as shown in the accompanying drawings, it is possible to gain increased expansion of gases during the power cycle of the machine by proportioning the chambers 23 so that they have a substantially larger volumetric displacement than the chambers 22, resulting in an engine or machine of increased efficiency. The operation of the machine will be apparent from the diagrams of Fig. 8, 9 and 10, wherein the cycles of operation are shown. Fig. 8 shows the parts of the machine in a position where the intake of clean combustion air has just been completed by drawing air through the ducts 58 and into the chambers 22. Fig. 9 shows the parts of the machine in a position where the combustion or expansion of gases is taking place in the chambers 23 and the intake air is carried toward the passage 47. And, Fig. 10 shows the parts of the machine in a position where the intake air is being compressed prior to combustion and the combusted air to be exhausted is being carried toward the exhaust ducts 59. It will be clear from these three figures how the compressed air is transferred through the combustion chambers to the chambers 23 in the drive rotor C. When the machine is used as a compressor, or the like, a suitable arrangement of inlet ducts 58' and outlet ducts 59' may be employed corresponding to the ducts 58 and 59, as shown diagrammatically in Fig. 15.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor with oppositely inclined end walls and opening at the face thereof, and valve means in the stator engaging said walls and controlling flow of fluids from the charging rotor to the power rotor.

2. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, and valve means in the stator and controlling flow of fluids from the charging rotor to the power rotor, and including, a slide shiftably carried in an opening extending axially through the stator.

3. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, and valve means in the stator and controlling flow of fluids from the charging rotor to the power rotor and including, a slide shiftably carried in an opening extending axially through the stator, there being sealing members carried by the slide and engageable in the chamber.

4. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor with a bottom and side walls and oppositely inclined end walls and opening at the face thereof, and valve means in the stator and controlling flow of fluids from the charging rotor to the power rotor, and including, a slide shiftably carried in an opening extending axially through the stator, and having ends engageable with said bottom and end walls, there being sealing members carried by the slide and engageable with said walls of the chambers.

5. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, fluid intake means adapted to deliver fluid to the charging rotor, fluid exhaust means adapted to receive fluid from the power rotor, and valve means in the stator and controlling flow of fluids between the rotors.

6. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor with a bottom and side walls and oppositely inclined end walls and opening at the face thereof, fluid intake means adapted to deliver fluid to the charging rotor, fluid exhaust means adapted to receive fluid from the power rotor, and valve means in the stator and controlling flow of fluids between the rotors, and including, a slide shiftably carried in an opening extending axially through the stator, and having ends engageable with said bottom and end walls, there being sealing members carried by the slide and engageable with said walls of the chambers.

7. A rotary power machine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, coolant handling means comprising a chamber formed in the stator and receiving coolant through a duct, and valve means in the stator and controlling flow of fluids from the charging rotor to the power rotor and including, a slide shiftably carried in an opening extending axially through the stator.

8. A rotary power machine of the character described including, a case with a shaft extending therethrough, a circular stator rotatably surrounding the shaft and having opposite axially disposed faces, a pair of counter-rotating rotors one a charging rotor rotatably supported on the shaft and the other a power rotor fixed thereto and each with an axially disposed face juxtapositioned to a face of the stator, drive means synchronously connecting the rotors, a chamber formed in each rotor and opening at the face thereof, and valve means in the stator and controlling flow of fluids from the charging rotor to the power rotor, and including, a slide shiftably carried in an opening extending axially through the stator.

9. A rotary power machine of the character described including, a case with a shaft extending therethrough, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, coolant handling means comprising a chamber formed in the stator and receiving coolant through a duct entering the case, and ports in the stator discharging coolant into the case surrounding the rotors, and valve means in the stator and controlling flow of fluids from the charging rotor to the power rotor, and including, a slide shiftably carried in an opening extending axially through the stator.

10. A rotary internal combustion engine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor with oppositely inclined end walls and opening at the faces thereof, valve means in the stator engaging said walls and controlling flow of fluids from the charging rotor to the power rotor, and fuel handling means adapted to introduce fuel to the opening in the stator to be transferred to the power rotor.

11. A rotary internal combustion engine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, valve means in the stator and controlling flow of fluids from the charging rotor to the power rotor, and including, a slide shiftably carried in an opening extending axially through the stator, and fuel handling means adapted to introduce fuel to the opening in the stator to be transferred to and received in the chamber of the power rotor.

12. A rotary internal combustion engine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, valve means in the stator and controlling flow of fluids from the charging rotor to the power rotor, and including, a slide shiftably carried in an opening extending axially through the stator, and fuel handling means adapted to introduce fuel to the charging rotor to be received in the chamber thereof and then transferred to the chamber in the power rotor by the said valve means.

13. A rotary internal combustion engine of the character described including, a circular stator with opposite axially disposed faces, a pair of counter-rotating rotors, one a charging rotor and the other a power rotor and each with an axially disposed face juxtapositioned to a face of the stator, drive means synchronously connecting the rotors, a chamber formed in each rotor and opening at the face thereof, valve means in the stator and controlling flow of fluids from the charging rotor to the power rotor, and including, a slide shiftably carried in an opening extending axially through the stator, and fuel handling means adapted to introduce fuel to the charging rotor to be received in the chamber thereof and transferred to the chamber in the power rotor by said valve means.

References Cited in the file of this patent

UNITED STATES PATENTS

| 1,362,400 | Deubel | Dec. 14, 1920 |
| 1,572,000 | Deubel | Feb. 9, 1926 |
| 1,686,767 | Saxon | Oct. 9, 1928 |